United States Patent
Knitter et al.

(10) Patent No.: US 8,510,450 B2
(45) Date of Patent: Aug. 13, 2013

(54) RECONCILIATION OF WEB SERVER SESSION STATES WITH CLIENT BROWSER STATES

(75) Inventors: Jay D. Knitter, Ft. Collins, CO (US); Wade J. Satterfield, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2195 days.

(21) Appl. No.: 11/408,375

(22) Filed: Apr. 22, 2006

(65) Prior Publication Data
US 2007/0250634 A1 Oct. 25, 2007

(51) Int. Cl.
*G06F 15/16* (2006.01)

(52) U.S. Cl.
USPC .......................................... 709/227

(58) Field of Classification Search
USPC .......................... 709/224, 227; 715/744, 745
See application file for complete search history.

(56) References Cited

U.S. PATENT DOCUMENTS

| | | | |
|---|---|---|---|
| 6,477,590 B1 * | 11/2002 | Habusha et al. | 710/29 |
| 2005/0071464 A1 | 3/2005 | Kuwata et al. | |
| 2005/0132297 A1 | 6/2005 | Milic-Frayling et al. | |
| 2005/0257400 A1 | 11/2005 | Sommerer et al. | |
| 2006/0155857 A1 * | 7/2006 | Feenan et al. | 709/227 |
| 2006/0294240 A1 * | 12/2006 | Sattler et al. | 709/227 |
| 2007/0083813 A1 * | 4/2007 | Lui et al. | 715/709 |

* cited by examiner

*Primary Examiner* — Jeffrey R Swearingen

(57) ABSTRACT

The present invention provides a method, a system, and computer readable media for reconciling a web-server session state with a client web-browser state. The method involves responding to an $n^{th}$ request, by reading an $m^{th}$ session-state identifier included in the request, where $n > m \geq 1$. The server then assumes an $m^{th}$ session state associated with the $m^{th}$ session state identifier.

19 Claims, 3 Drawing Sheets

RECONCILIATION OF WEB SERVER SESSION STATES WITH CLIENT BROWSER STATES

BACKGROUND OF THE INVENTION

Herein, related art is discussed to put the invention in context. Related art labeled "prior art" is admitted prior art; related art not labeled "prior art" is not admitted prior art.

Users can navigate the World Wide Web (and networks using Web protocols) by typing in a Web destination in the form of a Uniform Resource Locator (URL). Activating the URL (e.g., by pressing the "Enter" key") sends a request to a "server", a computer or group of computers collectively providing services to the requesting computer. The server handles the request, e.g., by activating certain resources and responds, e.g., by sending a code that the client's web browser can use to construct a page for a user to view and interact with. A typical page will include textual and or graphical (including "buttons"); activating a link (e.g., clicking on a button), automates sending a request.

From the user's and browser's point of view, the user is navigating from page to page. As a user moves from page to page, the browser can cache the prior pages on the user's computer. This allows the user to return to a previously viewed page without having to send another request to the server, saving time and bandwidth. Typically, a user can navigate back and forth through cached pages using a back button and a forward button, both standard in web browsers.

While many requests are context independent, some require the server to know the context in which the request was made. Typically, the context is the last page served to the client making the request. Accordingly, the server can track client requests so that it can determine the client's state and thus the context of a request made during that state. However, as web browsers do not inform the server when a user navigates among cached pages, e.g., by pressing the back button, it is possible for the client to be in a state different from the most recent state provided by the server. This can cause the server to respond inappropriately to a request, possibly resulting in confusion, dissatisfaction, and/or economic harm.

Perhaps the most common solution to this problem is to put text in a page warning the user not to press the back button. However, this does not always stop a user, e.g., who does not read everything on the page before doing something that is second nature to most users of web browsers. Some servers serve pages with embedded code (e.g., Javascript) that disables or hides the web browser's back button. However, users may be annoyed to lose their standard navigation tool, especially as it tends to appear more responsive than using links (which, unlike the back button, require a request to and a response from a server). Also, it is difficult to write code that addresses all web browsers. For example, not all browsers execute Javascript or execute the same piece of Javascript with exactly the same results. Also, it is difficult for code to take into account all methods (e.g., including keyboard shortcuts, pop-up menus) of navigating cached pages.

BRIEF DESCRIPTION OF THE DRAWINGS

The following drawings are of embodiments/implementations of the invention and not of the invention itself.

DETAILED DESCRIPTION

Figure 1:
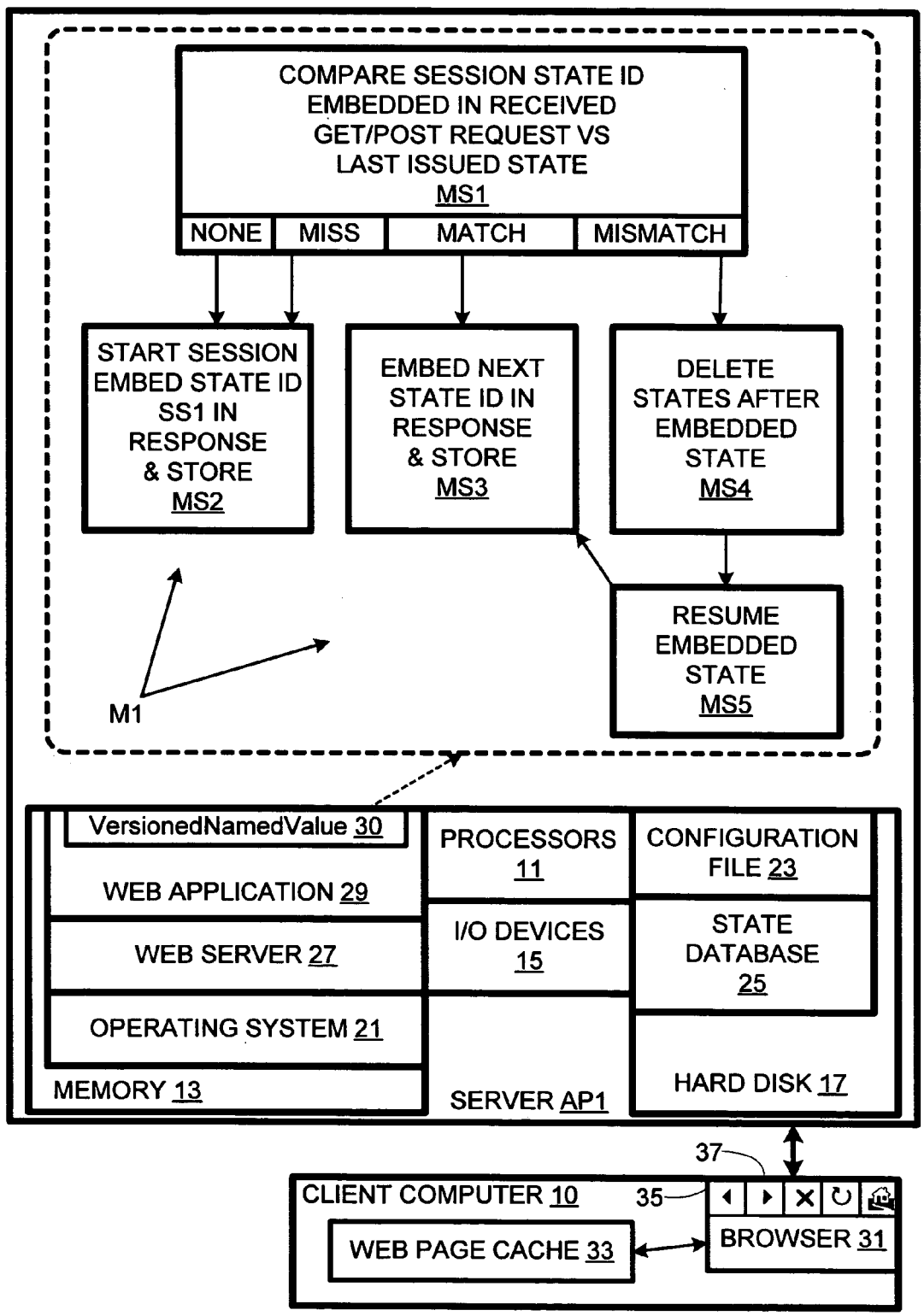
FIG. 1 is a combination block diagram and flow chart of a server and a method in accordance with embodiments of the invention.

The present invention provides a method, a system, and computer-readable storage media for reconciling a web-server session state with a client web-browser state. The method involves responding to an $n^{th}$ request, by reading an $m^{th}$ session-state identifier included in the request, where $n > m > 1$. The server then assumes an $m^{th}$ session state associated with the $m^{th}$ session-state identifier.

A server AP1 provides services to a client computer 10 in accordance with the present invention. Server AP1 includes processors 11, memory 13, input/output devices 15, and a hard disk 17. Hard disk 17 stores configuration file 23 and a state database 25. An operating system 21, a web server 27, and a web application 29 are executed from memory 17. Other embodiments include multiple servers, servers with multiple partitions, various types of I/O devices, multiple hard disks or alternative long-term storage, and various software configurations.

When an HTTP request is received from client computer 10, operating system 21 forwards it to request handler program 27, which refers to configuration file 23, which instructs program 27 to forward the request to web application 29. Then web application 29 reads the request and makes a function call to object 30 of a C++ class "VersionedNamedValue". (This software involves storing transferring instructions from hard disk 17 to memory 13 and to processor 11 for execution.) Object 30 implements a method M1, shown in the detail for object 30. In alternative embodiments, method M1 is implemented using a variety of C++ programs and programs in other programming languages.

Method M1 begins with a method segment MS1 involving comparison of a session-state ID (identifier) embedded in a received HTTP (Hyper-Text Transfer Protocol) request with a most recently issued session-state. There are four possible outcomes: 1) "match"—the included session-state ID matches the last state ID issued by object 30 for the current session; 2) "mismatch"—the included session-state ID does not match the last state ID issued by object 30 for the current session but does match another state ID known to the web application; 3) "miss"—the included session-state ID does not match any state ID known to the web application; and 4) "none"—the request does not include a session-state ID issued in the current session.

A miss can occur, for example, when a user attempts to resume a session that has timed out. For security reasons, and to have a mechanism to clean up old session data, the session data is deleted if no pages have been requested for some period of time, say an hour. A session timeout will generally be detected before method M1 is called and the user will be returned a page to login or otherwise start a new session.

The absence of a session-state ID in a request can occur when a request initiates a session. Web application 29 responds to a such client request by opening a session and generating a "page" with embedded session state ID SS1 indicating the session and the state within the session associated with the page at method segment MS2. The page with embedded state information is transmitted (via an I/O device 15) to client computer 10. A browser program 31 on client computer 10 then displays the page to a user. Server AP1 then stores session information and page (or at least some of the information associated with the page) information in association with the session-state ID in state database 25.

The session-state ID generated at method segment MS2 is embedded in the associated page in such a way that when a user of client computer 10 makes a request from that page, the session-state ID is embedded in the request. For example, the page can include one or more hyperlinks that can be activated by a user (e.g., by clicking on a link). When the user activates a hyperlink, a request is generated. In accordance with the invention, the URL for this request can include the embedded session-state ID. Alternatively, a non-URL portion of the request can include the session-state ID.

When a user makes a request including a session-state ID, method segment MS1 applies. The server keeps a counter of the most recent session state ID that was used. The next page, regardless of the ID in the request, would return a page with a session state ID that is one greater than the current counter. Most of the time, the session-state ID embedded in the request made in an on-going session will match the last-issue session-state ID (represented in the counter) so that a "match" occurs. In this case, method M1 proceeds to method segment MS3, which involves generating a page with a "next" session-state ID. This page is transmitted to client computer 10. Also, associated page information is stored in association with the current session and embedded state ID in state database 25.

Client browser 31, like most web browsers, stores pages in a page cache 33. Thus, during a session, when client computer 10 receives a page, the previous pages of the session remain hidden but available in cache 33. The user is able to use the browser interface, e.g., "back" (◀) button 35 and "forward" (▶) button 37, to navigate among the cached pages. This navigation among cached pages is invisible to server AP1, so server AP1 does not actually know what page a user is viewing.

If a user activates a hyperlink on a previously cached page of a current session, a "miss" will result from method segment MS1. In that case, method M1 proceeds to method segment MS4, which involves deleting or otherwise inactivating "subsequent" pages from state database 25. "Subsequent" here means pages generated after the one identified in the most-recent request. For example, if the most-recently generated page was the fifth in the session, but the most-recent request indicated it was from the third page in the session, then pages four and five would be deleted.

Note that most browsers delete cached pages "forward" of a page on which a hyperlink is activated, so method segment MS4 parallels the browser actions. However, in the server case, the purpose would be to save storage space, and is not absolutely necessary. For example, the page information might be used for statistical analysis or for customer profiling. However, they would not be referred to in the context of the current session. Whether or not the "subsequent" pages are actually deleted, object 30 resumes the state indicated in the most-recent request and responds accordingly at method segment MS3, as shown in FIG. 1.

It should be noted that method M1 does not require an explicit comparison at method segment MS1. Instead, method M1 can involve receiving a request with an embedded session state and calling up the associated page information from state database 25 without making a separate comparison. In this case, the comparison is implicit in the database lookup.

Figure 2:
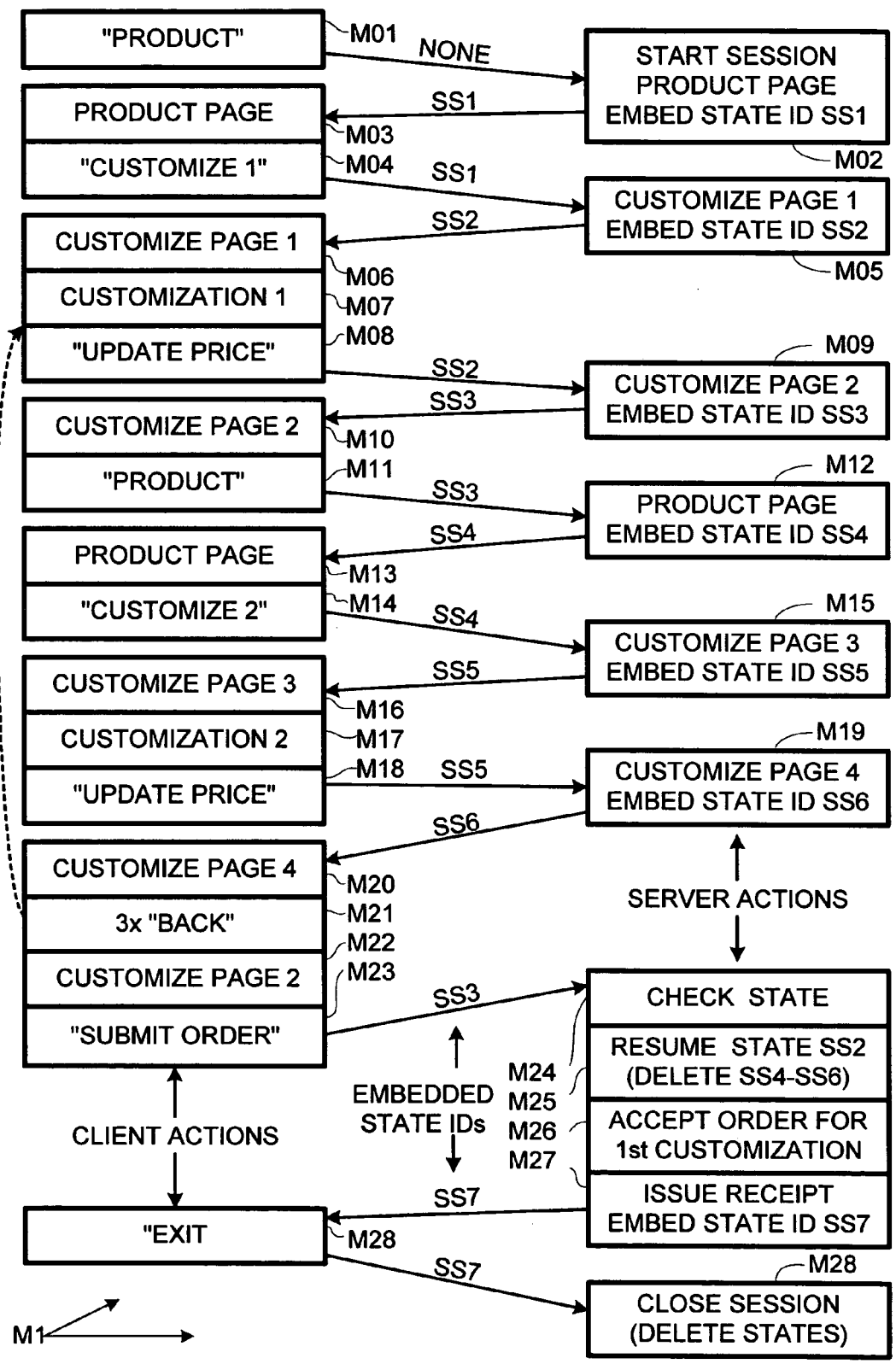
FIG. 2 is a flow chart of detailed instance of the method of FIG. 1. Referents M01-M28 refer to method segments.

A very specific instance of method M1 is flow-charted in FIG. 2 for expository purposes; this instance is not intended to be limiting in any way. A user via browser 31 activates a hyperlink button "Product" to a vendor product page at method segment M01. This causes a request with no session-state ID to be sent to server AP1. In response, at M02, server AP1 initiates a session and transmits the requested product page with a first embedded session-state ID SS1 to client computer 10. In addition, the session is opened in database 25 and page information is associated in database 25 with the session-state ID SS1.

The product page, displayed at M03, includes pictures, descriptions, and prices for budget and high-end desktop computers. The page also includes hyperlink buttons labeled "purchase" and "customize" for each product. Activating any of these would generate a request with session-state ID SS1 embedded. At M04, the user activates the "customize" button for the budget computer, so that a request with session-state ID SS1 is transmitted to server AP1. At M05, server AP1 responds by transmitting a first customize page with embedded session-state ID SS2 to client computer 10. In addition, information for the first customize page is associated with state-session ID SS2 and the current session in session database 25.

Browser 31 displays the first customize page and caches the product page at M06. The first customize page contains a list of components with which the budget computer can be configured. The first customize page is interactive in that it contains radio buttons that can be darkened in possible combinations. For example, the budget computer can be configured with the stock hard disk or a larger hard disk, but not with both. Accordingly, the page has the button next to the listing for the stock hard disk darkened. The user clicks on the button associated with the larger hard disk; in response, that button darkens and the button next to the stock hard disk lightens (deselecting the stock hard disk). Similar options can be indicated for memory, I/O devices, and accessories. The user clicks on a number of the radio buttons to elect a potential configuration or "first configuration" of the desktop at M07. These selections are not communicated to server AP1 until an "update price" button is activated.

When the user activates the "update price" button at M08, a request with session state SS2 embedded is transmitted to server AP1. This request indicates the combination of components selected by the user. Object 30 compares the session state indicated in the request to the most-recent session state. In this case, they match. At M09, web application 29 generates a second customize page with the calculated price and with a session state SS3 embedded. Object 30 stores the information and the session-state ID for this page in database 25.

At M10, browser 31 displays this second customize page, which looks just like the first customize page as configured by the user except that the listed price reflects the configuration selected by the user. To the user, it may appear that the page is the same and only a field has been updated. However, browser 31 treats it as a new page and caches the first customize page containing the new configuration but with the stock price.

At M11, the user activates a link on this second customization page to the product page, e.g., to consider the high-end desktop. This sends a request with session-state SS3 embedded. At M12, server AP1 checks the session-state ID and finds it matches the most recently issued session state; server AP1 responds by retransmitting the product page, this time with session-state SS4 embedded. At M13, browser 31 displays the product page and caches the prior customization page with the selected configuration for the budget computer. At M14, the user activates a "customize" button for the high-end computer, which uses a different processor chip set than the budget computer.

At M15, server AP1 checks the session state ID for the resulting customize request, finds a match to the most-recent session-state ID SS4. Accordingly, server AP1 generates and transmits a third customize page, this time representing the high-end computer. At M16, browser 31 displays this third customize page, caching the product page. This high-end computer customize page presents the same options as the customize pages for the budget computer, although the stock configurations differ. The user reconfigures the third customize page at M17 and clicks "update price" at M18.

At M19, server AP1 checks the session-state ID for the resulting request and finds a match with most recent session-state ID SS5. Accordingly, server AP1 generates and transmits a fourth customize page. Browser 31 displays the fourth customize page at M20. Perhaps unhappy with the price, the user intends to order the customized budget version. Rather than linking back to the product page, then to the customize page for the budget computer, and then re-customizing the budget computer, the user activates the browser "back" button three times at M21—first back to customization 2, then back to the product page, and finally back to the first customize page (which shows the reconfigured budget computer with the correct price) at M23.

At M23, from the second customize page, the user activates a "submit order" button. This results in a request with the session-state ID associated with customize page 2 at M10, namely, session-state SS3. Browser 31 also deletes "subsequent" cached pages, in this case, the product page of M11, customize page 3 of M16, and customize page 4 from M20, from cache 33.

When, at M24, server AP1 checks the session-state ID, it does not match the most recent session-state ID SS6. Accordingly, session-state SS3 is resumed and session states SS4-SS6 are deleted at M25. Since the order relates to the customize 2 page, server AP1 records an order for the customized budget computer at M26. At M27, server AP1 generates and transmits a receipt with embedded session state ID SS7. The user activates an "exit" button on the receipt page, generating a message with session-state SS7 embedded. Server AP1 recognizes the nature of the message and closes the session, deleting the associated pages at M28.

As mentioned above, the sequence of FIG. 2 is a very specific instance of method M1, which, in turn, is one embodiment of the invention. In this embodiment, the session state IDs are serialized, in part so that that the current state can be assembled from partial information for that state and its predecessors. If each page stored by server AP1 holds all of the information required to put a request in context, it is not necessary to serialize the session states. Also, it is not necessary to assign a new session ID to each page generated, and it is not necessary that every link on a page generate a request with a session ID embedded. For example, links, e.g., help links, that display information that is independent of the state of the web application need not have state IDs embedded.

Figure 3:
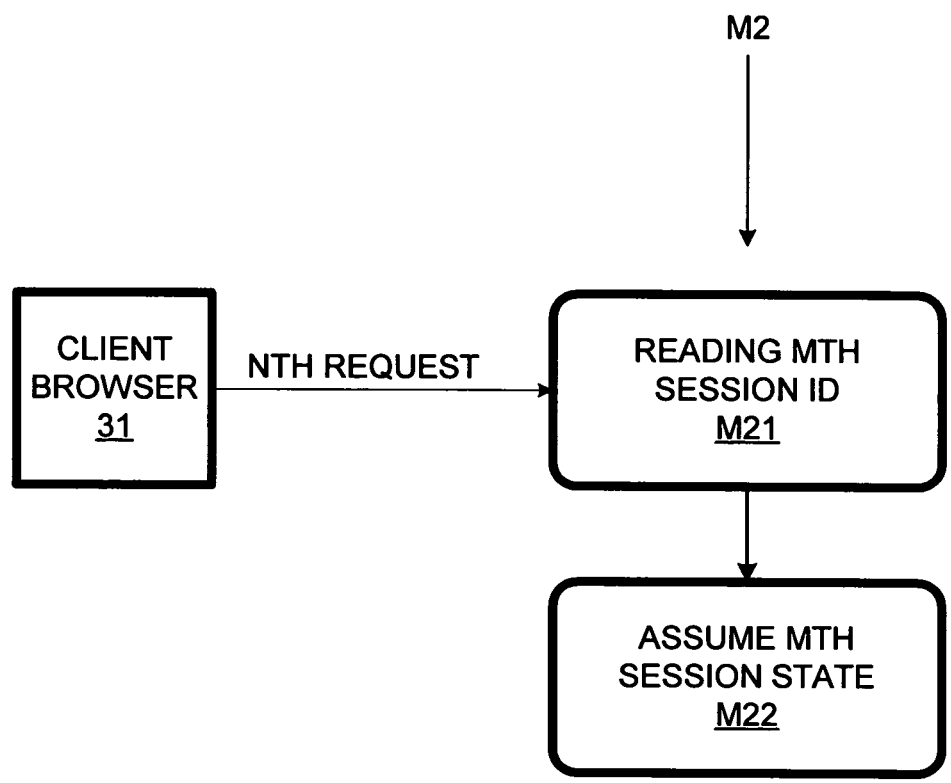
FIG. 3 is a flow chart of a second method in accordance with an embodiment of the invention.

A method M2 in accordance with an embodiment of the invention includes method segments M21 and M22, as shown in FIG. 3. Method segment M21 involves responding to a nth serialized request from client browser 31 by reading an embedded session state ID. In this case, the embedded session ID does not match the most recent session state known to the server. Accordingly, at method segment M22, the server assumes the mth session state.

A mismatch can occur because a back button has been used or because a user is using two windows within the same session. This can happen when the user uses the "new window" menu pick on a browser after starting a session in a web application. Both windows will be using the same session ID. For example, the user might start using web application 29 and visit five pages with session-state IDs of 1, 2, 3, 4, and 5. At this point the user could use the "new window" menu pick and have two browser windows displaying a page with a session-state ID of "5". The user could use one browser window, say the "left" browser window, to request a new page and get one with a session-state ID of "6". When the user goes to the "right" browser window it will be at session-state ID "5", but return a page with a session-state ID of "7"; a side effect of this is to mark session-state ID "6" as invalid. If the user ever returns the left browser window, its state will be marked as invalid and the split window will have been detected.

By having each session-state ID keep track of its predecessor session-state ID in accordance with an embodiment of the invention, it is possible to allow the user to use both windows in a consistent way. Doing this assumes the domain of the web application allows this without other problems. Alternatively, the web application can then return a page to the user that alerts them to this potentially confusing state.

While in the foregoing description, the back button was used to navigate pages cached by a browser, the invention applies to other methods for navigating cached pages, including using physical buttons on a keyboard. Also, cases where navigation involves use of the "forward" button are covered. Most browsers offer a "new window" menu pick. This starts a second window with the same session identifier. Often the user will use the new window to go off to a different web site and this will not confuse the web application. However, web applications can become confused when a user alternates between two windows associated with different states for the same website. The present invention provides for detecting this and supporting the states of the multiple browser windows. These and other variations upon and modifications to the illustrated embodiments are provided for by the present invention, the scope of which is defined by the following claims.

What is claimed is:

1. A web-server implemented method of reconciling a web-server session state with a client web-browser state, said method comprising:
   responding to an $n^{th}$ request from a client web browser by reading an $m^{th}$ session-state identifier included in said request, where $n-1>m \geq 1$, where integer values m correspond to a chronological succession of web-server session states of a session;
   assuming an $m^{th}$ session state associated with said $m^{th}$ session-state identifier;
   deleting session states m+1 through n−1 from said server in response to said nth request;
   a user navigating among pages cached by a web browser; and
   said user activating a link on a page cached by said web browser so that n−1>m.

2. A method as recited in claim 1 further comprising:
   storing an $n^{th}$ session state and transmitting to said client an $n^{th}$ page related to said $n^{th}$ session state and having an $n^{th}$ link that when activated by said client generates an $n^{th}$ request including an $n^{th}$ session-state identifier for said $n^{th}$ session state.

3. A method as recited in claim 1 wherein said navigating at least in part involves activating a back button of said web browser.

4. A method as recited in claim 1 wherein said session-state identifiers are serialized.

5. A method as recited in claim 1 wherein said requests involve HTTP GET and POST commands and said session reading an $m^{th}$ session state involves making a function call to a program object.

6. A method as recited in claim 1 further comprising detecting the use of two or more windows in a session, and tracking the session in each window.

7. A non-transitory computer-readable storage media comprising:
a program for reconciling a web-server session state with a client web-browser state, said program providing for:
responding to an $n^{th}$ request from a client browser by reading an $m^{th}$ session-state identifier included in said request, where $n-1>m \geq 1$, and where integer values of m correspond to chronological session states of a session, and
assuming an $m^{th}$ session state associated with said $m^{th}$ session state identifier;
wherein said program further provides for deleting session states m+1 through n−1 from said server, wherein $n-1>m$, in response to said $n^{th}$ request;
wherein said program further provides for enabling a user to navigate among pages cached by a web browser so that a user can activate a link on a page cached by said web browser.

8. The non-transitory computer-readable storage media as recited in claim 7 wherein said program further provides for storing an $n^{th}$ session state and transmitting to said client an $n^{th}$ page related to said $n^{th}$ session state and having an $n^{th}$ link that when activated by said client generates an $n^{th}$ request including an $n^{th}$ session-state identifier for said $n^{th}$ session state.

9. The non-transitory computer-readable storage media as recited in claim 7 wherein said navigating at least in part involves activating a back button of said web browser.

10. The non-transitory computer-readable storage media as recited in claim 7 wherein said requests involve HTTP request commands and said session reading an $m^{th}$ session state involves making a function call to a program object.

11. A server system comprising hardware and software for reconciling a web server session state with a client browser state by:
responding to an $n^{th}$ request by reading an $m^{th}$ web-server session-state identifier included in said request, where $n-1>m \geq 1$, wherein integer values of m correspond to a chronological series of session states; and
assuming an $m^{th}$ session state associated with said $m^{th}$ session state identifier;
wherein said hardware and software further provide for storing an $n^{th}$ web-serer session state and transmitting to said client an $n^{th}$ page related to said $n^{th}$ session state and having an $n^{th}$ link that when activated by said client generates an $n^{th}$ request including an $n^{th}$ session-state identifier for said $n^{th}$ session state;
wherein said software further includes interface means for enabling a user to navigate among pages cached by a web browser so that a user can activate a link on a page cached by said web browser so that $n-1>m$.

12. A server system as recited in claim 11 wherein said software further includes means for deleting session states m+1 through n−1 from said server, where $n-1>m$, in response to said $n^{th}$ request.

13. A server system as recited in claim 11 wherein said navigating at least in part involves activating a back button of said web browser.

14. A server system as recited in claim 11 wherein said requests involve HTTP requests and said session reading an $m^{th}$ session state involves making a function call to a program object.

15. A method of reconciling a web-server session state with a client web-browser state, said method comprising:
responding to a first HTTP request from a client web browser by opening a web session, said first HTTP request being a first request of said session;
receiving an $i^{th}$ HTTP request of said session having a $j^{th}$ session-state identifier embedded therein, i and j being counting number indices and j<i; and
determining from said $j^{th}$ session-state identifier that said $i^{th}$ HTTP request was made from a $j^{th}$ page provided in said session when j=(i−1) and when j<(i−1).

16. A method as recited in claim 15 further comprising responding in accordance with a result of said determining to said $i^{th}$ HTTP request with an $i^{th}$ web page having an $i^{th}$ identifier embedded therein so that an HTTP response thereto has said $i^{th}$ session-state identifier embedded therein.

17. A system comprising non-transitory computer-readable storage media encoded with a program that, when executed, provides for:
responding to a first HTTP request from a client web browser by opening a web session, said first HTTP request being a first request of said session;
receiving an $i^{th}$ HTTP request of said session having a $j^{th}$ session-state identifier embedded therein, i and j being counting number indices and j<i; and
determining from said $j^{th}$ session-state identifier that said $i^{th}$ HTTP request was made from a $j^{th}$ page provided in said session when j=(i−1) and when j<(i−1).

18. A system as recited in claim 17 wherein said program further provides for responding in accordance with a result of said determining to said $i^{th}$ HTTP request with an $i^{th}$ web page having an $i^{th}$ identifier embedded therein so that an HTTP response thereto has said $i^{th}$ session-state identifier embedded therein.

19. A system as recited in claim 17 further comprising a server for executing said program, said server including said media.

* * * * *

UNITED STATES PATENT AND TRADEMARK OFFICE
CERTIFICATE OF CORRECTION

PATENT NO. : 8,510,450 B2
APPLICATION NO. : 11/408375
DATED : August 13, 2013
INVENTOR(S) : Jay D. Knitter et al.

Page 1 of 1

It is certified that error appears in the above-identified patent and that said Letters Patent is hereby corrected as shown below:

In the Claims

Column 6, line 42, in Claim 1, delete "values" and insert -- values of --, therefor.

Column 7, line 16, in Claim 7, delete "wherein" and insert -- where --, therefor.

Column 7, line 42, in Claim 11, delete "states;" and insert -- states of a session; --, therefor.

Column 7, line 46, in Claim 11, delete "web-serer" and insert -- web-server --, therefor.

Signed and Sealed this
Twenty-sixth Day of November, 2013

Margaret A. Focarino
*Commissioner for Patents of the United States Patent and Trademark Office*